United States Patent
Sattler et al.

(10) Patent No.: US 9,751,183 B2
(45) Date of Patent: Sep. 5, 2017

(54) METHOD FOR HIGH-PRECISION CORNER CONTOURING OF FLAT GLASS SUBSTRATES IN A CONTINUOUS FEED-THROUGH PROCESS

(71) Applicants: SCHOTT AG, Mainz (DE); SCHOTT V.T.F., Troisfontaines (FR)

(72) Inventors: Jochem Sattler, Neustadt/Wstr. (DE); Dominique Greiner, Buhl-Lorraine (FR)

(73) Assignees: SCHOTT AG, Mainz (DE); SCHOTT V.T.F., Troisfontaines (FR)

( * ) Notice: Subject to any disclaimer, the term of this patent is extended or adjusted under 35 U.S.C. 154(b) by 130 days.

(21) Appl. No.: 14/802,414

(22) Filed: Jul. 17, 2015

(65) Prior Publication Data

US 2016/0016276 A1 Jan. 21, 2016

(30) Foreign Application Priority Data

Jul. 17, 2014 (DE) .......................... 10 2014 213 953

(51) Int. Cl.
*B24B 9/10* (2006.01)
*B24B 7/24* (2006.01)
*C03B 35/14* (2006.01)

(52) U.S. Cl.
CPC .............. *B24B 9/102* (2013.01); *B24B 7/244* (2013.01); *C03B 35/14* (2013.01); *C03B 2225/02* (2013.01)

(58) Field of Classification Search
CPC B24B 7/24; B24B 7/242; B24B 7/244; B24B 7/245; B24B 9/002; B24B 9/102; B24B 9/08; B24B 41/053; C03B 2225/02
See application file for complete search history.

(56) References Cited

U.S. PATENT DOCUMENTS

| | | | | |
|---|---|---|---|---|
| 2,175,296 A | * | 10/1939 | Kirkman ................ | B24B 9/102 451/182 |
| 2,272,651 A | * | 2/1942 | Waldron ................ | B24B 9/102 451/261 |
| 4,060,937 A | * | 12/1977 | Glazer .................... | B24B 9/102 271/267 |
| 4,616,966 A | * | 10/1986 | Ohyama ................ | B24B 9/002 409/132 |
| 4,739,590 A | * | 4/1988 | Myers .................... | B24B 9/102 451/11 |
| 5,536,197 A | * | 7/1996 | Barozzi .................. | B24B 9/107 451/189 |

(Continued)

FOREIGN PATENT DOCUMENTS

| | | |
|---|---|---|
| DE | 3035612 A1 | 5/1982 |
| EP | 1190816 B1 | 3/2008 |
| JP | 2001239443 A | 9/2001 |

*Primary Examiner* — Timothy V Eley
(74) *Attorney, Agent, or Firm* — Ohlandt, Greeley, Ruggiero & Perle, L.L.P.

(57) ABSTRACT

A method is provided for corner contouring of flat glass substrates in a continuous feed-through process by a contouring tool. The method includes the steps of: synchronization of the movement of the contouring tool to the continuous feed-through movement of the flat glass substrate, contouring of a corner of the flat glass substrate, wherein a relative movement between the contouring tool and the flat glass substrate is performed so as to overlap the continuous feed-through movement.

12 Claims, 5 Drawing Sheets

(56) References Cited

U.S. PATENT DOCUMENTS

| | | | | |
|---|---|---|---|---|
| 5,908,530 | A  * | 6/1999 | Hoshizaki | ............... B24B 7/241 |
| | | | | 156/345.14 |
| 6,685,541 | B2 * | 2/2004 | Brown | ................... B24B 9/102 |
| | | | | 451/41 |
| 6,887,140 | B2 | 5/2005 | Bovone | |
| 7,001,249 | B1 * | 2/2006 | Pride | ....................... B24B 9/102 |
| | | | | 451/190 |
| 9,296,080 | B2 * | 3/2016 | Kuge | ................... B65G 49/065 |
| 2002/0034927 | A1 | 3/2002 | Bavelloni | |
| 2008/0090502 | A1 * | 4/2008 | Sandri | .................... B24B 9/102 |
| | | | | 451/267 |
| 2010/0279588 | A1 | 11/2010 | Balbi | |
| 2014/0335764 | A1 * | 11/2014 | Brown | ..................... B24B 9/10 |
| | | | | 451/44 |

* cited by examiner

METHOD FOR HIGH-PRECISION CORNER CONTOURING OF FLAT GLASS SUBSTRATES IN A CONTINUOUS FEED-THROUGH PROCESS

CROSS REFERENCE TO RELATED APPLICATIONS

This application claims benefit under 35 U.S.C. §119(a) of German Patent Application No. 10 2014213 953.8 filed Jul. 17, 2014, the entire contents of which are incorporated herein by reference.

BACKGROUND OF THE INVENTION

1. Field of the Invention

The present invention relates to a method for corner contouring of flat glass substrates, such as, for example, for household appliances, in a continuous feed-through process.

2. Description of Related Art

Edge grinding represents an important part of forming post-processing of flat glass substrates. This process step is generally performed in a continuous feed-through method, in which, first of all, the lengthwise edges are simultaneously worked, after which the flat glass substrate is rotated by 90° and then the transverse edges are ground to final dimension. In this process, feed speeds of up to 12 m/min can be achieved at present. For large end dimensions, such as those occurring in the field of household appliances, for example, unit quantities of up to 1000 units/hour can be achieved based on these feed speeds.

At such high feed speeds, however, a specific working of the corners of flat glass substrates is generally dispensed with or else they are only broken off by a simple, mechanically controlled, and often inaccurate edge impact.

Thus, for example, EP 1 190 816 B1, discloses a corner grinding unit for working the corners of flat glass plates in a continuous feed-through process in which a grinding tool is positioned and guided under force within a cage constructed from guide rollers in such a way that the worked corner is broken off in the form of a 45° bevel.

Also disclosed in JP 20011239443 A are a method and an apparatus in which a glass substrate is advanced against a contouring tool in a continuous feed-through movement. The contouring tools are movably positioned solely perpendicular to the feed direction of the glass substrate and are moved synchronously to the continuous feed-through movement in such a way that the corners, in turn, are broken off in the form of a 45° bevel.

A drawback in each case is, on the one hand, a low precision of corner working and, on the other hand, a limited freedom of design for the corners.

A somewhat different approach is disclosed in DE 3035612, for example, which permits rounding of the corners of glass plates in a continuous feed-through process. The device has a periphery grinding wheel, which is suspended on a pivotable and spring-loaded arm. Although the rounding of corners affords a greater diversity of shapes, the reproducibility remains very limited, however, owing to inadequate axial control.

The same holds true also for an apparatus that has already been commercially marketed, in which a tool is guided on a carriage, positioned at a 45° angle, with modulated speed in such a manner that a radial geometry, albeit imprecise, is created at the individual corners.

With increasing demands for constantly higher accuracies and new esthetic characteristics due to more flexible or asymmetric or generally more complex contours, for example, in particular in the case of glasses for household appliances, such as fireplace glass, refrigerator components, control panels, or cooktops, manufacturers are being compelled to resort to slower and significantly more expensive processing methods involving the use of stationary grinding machines. A high precision is achieved hereby at the transitions between the lengthwise or transverse edges and the corners by operation in a single complete cycle without setting down or even exchanging the tool. However, the use of such stationary grinding machines allows throughputs of only approximately 100 units/hour per tool spindle employed to be achieved.

It would be desirable to unite the precision and variability that can be achieved with the stationary technique with the economy of the continuous feed-through process. In order to come closer to this goal, there have been additional approaches in recent years for integrating the corner working into continuous feed-through process equipment.

The most recent developments have been based on modern CNC control techniques and permit the working of complex contours at the corners in a completely continuous feed-through process that still has a throughput of up to 400 units/hours for flat glass substrates having the format of typical glasses for household appliances. The contouring tools can travel in two dimensions and are conveyed synchronously with the continuous feed-through movement of the work piece over a control path. The synchronized movement is triggered beforehand by the work piece passing the work station. This operation is referred to herein as synchronization of the movement of the contouring tool to the continuous feed-through movement of the flat glass substrate. Under programmed control, the tool approaches the corners and then travels over the programmed track. This operation is referred to as contouring, in which a relative movement between the contouring tool and the flat glass substrate is performed so as to overlap the continuous feed-through movement. With these apparatuses it is possible not only to work the corners but also to work the entire lengthwise edge in a complex contour with improved quality. The contouring tool, together with its CNC-controlled drive unit, constitutes a CNC unit.

A device for conducting a contouring method, which has a first table movable in the direction of continuous feed-through movement of the flat glass substrate and a second table, which is disposed on the first table, is movable perpendicular to the continuous feed-through movement, and which bears the contouring tool and its drive unit, is known from the document U.S. Pat. No. 6,887,140 B2. Each table has a stop that can be advanced against the flat glass substrate. The contouring takes place here on a flat glass substrate that is clamped in place.

The document US 2010/0279588 A1 describes a method of this type and the device related to it for corner contouring of flat glass substrates, in which the movement of a passing flat glass substrate is detected by means of a sensor and the movement of the grinding tool in the direction of feed is controlled so that the relative movement between tool and flat glass amounts to a constant zero, inasmuch as this is possible. After this, the grinding of the corners ensues.

However, a high-precision creation of corner radii is also not ensured in these solutions. The reason for this is, on the one hand, the heavy CNC unit, which responds sluggishly to the CNC control signal. On the other hand, the accuracy of the traveled contour depends on the dimensional stability as well as on the geometric and positional tolerances of the glass plate being worked, and on a high synchronicity between the continuous feed-through movement of the flat glass and the synchronized movement of the contouring tool. Consequently, starting point offsets of several tenths of a millimeter can ensue, which result in clearly visible, optical or cosmetic drawbacks, such as visible and tactile transitions of the corners to the lengthwise edges.

SUMMARY

The object of the present invention is to reduce the previously described drawbacks of the prior art.

The method for corner contouring of flat glass substrates in a continuous feed-through process by means of a contouring tool comprises the following steps: synchronization of the movement of the contouring tool to the continuous feed-through movement of the flat glass substrate, contouring of a corner of the flat glass substrate, wherein a relative movement between the contouring tool and the flat glass substrate is performed so as to overlap the continuous feed-through movement and wherein the relative movement is coupled to the flat glass substrate.

Decisive for an improvement in the corner contouring is the coupling of the relative movement of the contouring tool to the flat glass substrate and, in particular, to the corner of the flat glass substrate. Whereas, in the prior art, the synchronization of the movement of the contouring tool to the continuous feed-through movement of the flat glass substrate has been triggered by a start trigger and has then proceeded fully autonomously, the synchronization in accordance with the invention is supplemented by a coupling of the relative movement to the actual location of the corner of the flat glass substrate ("actual position"). As a result of the coupling, any deviation from the shape, position, and continuous feed-through movement of the flat glass substrate from a set value or expected value is constantly taken into account and corrected after synchronizing the movement of the contouring tool. Accordingly, the relative movement between the contouring tool and the flat glass substrate is determined solely by the (programmed) processing track of the contouring tool and it is possible to exclude starting point offsets, as a result of which the processing outcome is even considerably more precise. Transitions from the lengthwise edges and transverse edges to the contour of the corner are virtually no longer visible.

Another advantage of this method lies in the fact that only small demands in terms of accuracy have to be placed on the actual dimension of the glass being profiled, because the contour is made relative to the actual position of the corners.

Preferably, the relative movement proceeds in the plane of the flat glass, that is, in the plane spanned by the lengthwise and transverse edges. In particular, this has the advantage that the edge contouring, such as, for example, a C-cut or a double bevel or the like, can be produced continuously even at the corners.

In a preferred embodiment of the method according to the invention, the relative movement occurs, as already stated, in a manner that is coupled to the position of the corner of the flat glass substrate. Basically, it does not matter whether the position of the corner is detected directly or whether, for example, it is interpolated after detecting other geometric features of the flat glass substrate, such as, for example, its lengthwise and transverse edges, or after detecting markings provided specifically for positional detection.

Preferably, the relative movement is coupled mechanically, electrically, acoustically, or optically to the flat glass substrate.

In the case of a mechanical coupling, the contouring track describing the relative movement is coupled by means of at least one mechanical contact between the flat glass substrate and a stop that is entrained with the synchronized movement of the contouring tool. This contact can be form-fitting and comprise, at the same time, force components.

Electrical coupling is understood to mean that the coupling occurs by means of at least one electrical contact or one capacitive proximity sensor, with it being possible to detect the actual position of the corner, as described above, directly at the corner itself or at given reference points of the flat glass substrate and, if need be, a correction of the synchronized movement of the contouring tool can be made available.

Analogously, a determination of the actual position of the corner and thus a coupling in the sense of the invention can also occur continuously by means of an acoustic distance sensor (ultrasound sensor) or by means of an optical distance sensor (interference or running time measurement) or by means of image acquisition and analysis and, if need be, a correction of the synchronized movement of the contouring tool can be made available.

In another advantageous embodiment, the method is characterized in that the synchronization of the movement of the contouring tool to the continuous feed-through movement of the flat glass substrate comprises a synchronization of the movement of a first carrier unit to the continuous feed-through movement of the flat glass substrate and in that the coupling (mechanical coupling), an electrical coupling, an optical coupling, or an acoustical coupling of the relative movement to the flat glass substrate comprises placing a second carrier unit in a form-fitting manner on the flat glass substrate, with the second carrier unit being movably mounted on the first carrier unit and with the relative movement being a movement of the contouring tool that is controlled relative to the second carrier unit. It is decisive that the mechanical, electrical, optical, and acoustic coupling elements, i.e., the above-mentioned sensor, as well as also the entrained stop, are disposed on or against the second carrier unit and are entrained with the latter. In this way, a deviation of the actual position of the corner from its set position as well as also any unsteady movement, i.e., a differential movement between the flat glass substrate and the synchronized first carrier unit can be determined and equilibrated by means of the second carrier unit.

The method according to the invention for corner contouring of flat glass substrates in a continuous feed-through process by means of a contouring tool according to the aspect of mechanical coupling thus comprises in summary, the following steps: synchronization of the movement of a first carrier unit of the contouring tool to the continuous feed-through movement of the flat glass substrate; placement of a second carrier unit movably mounted on the first carrier unit in form-fitting manner against the flat glass substrate, which is also referred to here as "coupling"; contouring a corner of the flat glass substrate, wherein, while maintaining the form fit between the second carrier unit and the flat glass substrate, the contouring tool executes a movement that is controlled relative to the second carrier unit, so as to overlap the continuous feed-through movement.

In the case of this variant of the mechanical coupling, the second carrier unit provides, as it were, a stop running with it. This second carrier unit is synchronized with the continuous feed-through of the flat glass substrate on the basis of the movement of the first carrier unit by accelerating it to the speed of the work piece by means of suitable servo-drives. The coupling then occurs by a form-fitting placement of the second carrier unit, which is movably mounted on the first carrier unit, against the flat glass substrate, in two axial directions in the plane of the flat glass substrate. The movable mounting can preferably be supported by spring elements, which act between the first carrier unit and the second carrier unit in the direction of the two axes in the plane of the flat glass substrate (x and y directions) and press the second carrier unit permanently against the flat glass substrate as long as the coupling remains in place. In this way, it is possible to compensate both for any deviation in the actual position of the corner from its set position and any unsteady movement, that is, any differential movement between the flat glass substrate and the synchronized first carrier unit.

The actual contouring of the corners then begins with further, now coupled, synchronous travel, that is, with retention of the form fit between the second carrier unit and the flat glass substrate. In the process, the contouring tool performs a movement that is controlled relative to the second carrier unit, this being produced preferably by a CNC-programmed tool track, wherein at least parts of the actuating drive or servo-drive for the tool advance and in particular its reference point are arranged on the second carrier unit. Other drive elements, such as, for example, the spindle drive for the tool, are placed on the first carrier unit so as to reduce the spring-borne weight of the second carrier unit, with it being possible for a transmission of the torque to be produced by a Cardan shaft, for example. As is known, CNC tracks ensure highly precise and reproducible operating steps. Owing to the form fit between the glass substrate and the second carrier unit, the relative movement between the flat glass substrate and the contouring tool is determined exclusively by this predetermined track.

The spring forces by which the second carrier unit is pressed against the flat glass substrate are preferably chosen to be greater than the feed and cutting forces of the tool occurring during working, so that the processing forces during contouring of the corner do not bring about any significant relative movement of the tool with respect to the flat glass substrate, but, on the other hand, are still sufficiently small that a smooth form-fitting placement is possible.

One CNC unit as described above can be provided for each corner of the flat glass substrate in order to simultaneously work all of the corners. Each CNC unit is arranged on an associated first carrier unit. The first carrier unit and the unit must each have available an adequate travel path between a starting position and a final position in order that the duration of the synchronous travel is sufficient for complete corner contouring.

In another advantageous embodiment, the form-fitting placement of the second carrier unit against the flat glass substrate occurs tactilely.

The tactile placement is preferably realized via one or a plurality of signal transmitters, which is or are arranged on the second carrier unit. Coming into consideration are, for example, force sensors. Preferably, two signal transmitters with operating directions corresponding to those of the spring elements are provided. In the case of tactile placement, the first carrier unit travels along the glass substrate until the signal transmitter(s) emits or emit a signal upon a (first) contact (touch) with the glass substrate or upon exceeding a preset force value or by detecting a predetermined distance, by means of which the form fit is confirmed. Either immediately after the confirmation or after traversing a preset feed path, through which the spring elements are preferably pre-tensioned, the active part of the placement is ended. Afterward, the second carrier unit remains passively applied to the flat glass substrate by the spring elements. Any relative movement between the flat glass substrate and the contouring tool is afterward determined, as described above, exclusively by the predetermined tool track of the contouring tool.

The form fit between the second carrier unit and the flat glass substrate can be improved further in that, in accordance with an advantageous enhancement, a clamping is performed between the second carrier unit and the flat glass substrate. A clamping creates a more stable form fit, which withstands even greater processing forces and, for this reason, exhibits a reduced susceptibility to failure during corner contouring.

After the relative movement has ended, the coupling between the flat glass substrate and the contouring tool is also once again terminated. If the thus defined end point of the corner contouring has been reached, the first carrier unit (together with the CNC unit)—still synchronized to the continuous feed-through movement of the flat glass substrate—is withdrawn from the flat glass substrate until the second support no longer is applied against it—that is, the coupling is eliminated—and can then be retracted into its starting position. The contouring tool is then ready for the next flat glass substrate and the flat glass proceeds to the next process step.

BRIEF DESCRIPTION OF THE DRAWINGS

Further advantages and characteristics of the method according to the invention will be explained below on the basis of exemplary embodiments with the help of figures. Shown are.

DETAILED DESCRIPTION

In each of the figures described below, one view (that is, perpendicular to the plane of the flat glass substrate) onto an apparatus for executing the method according to the invention is shown as a snapshot image at different time points in the method.

Figure 1:
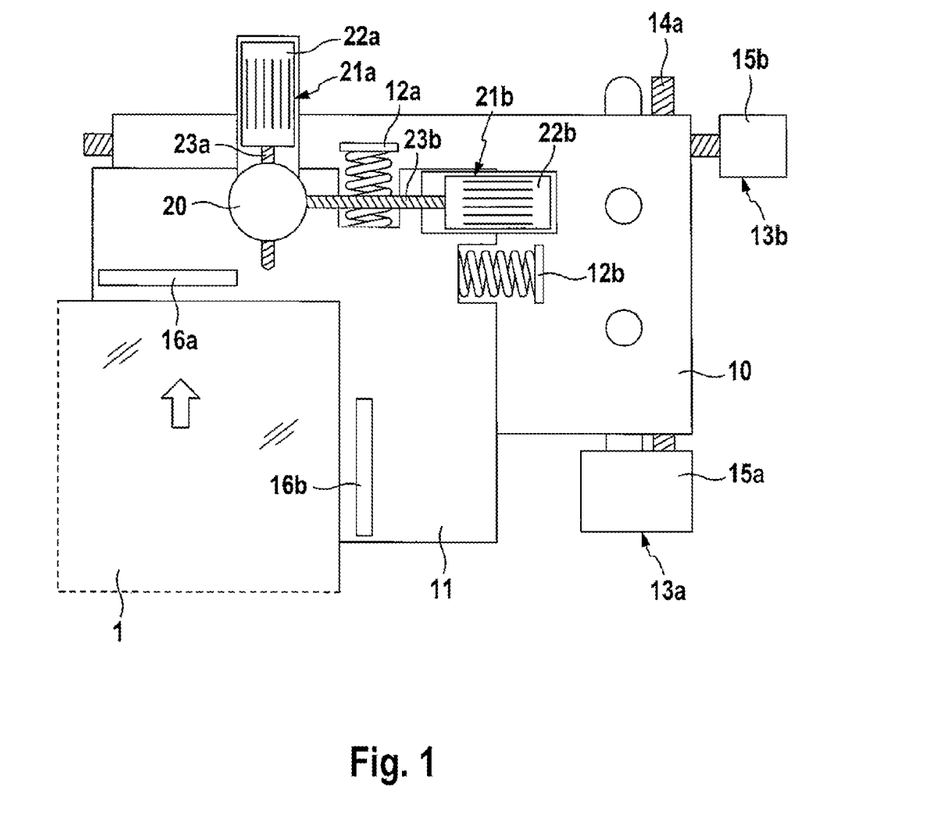
FIG. 1 the synchronization of the tool to the continuous feed-through movement of the flat glass substrate, FIG. 2 the coupling of the second carrier unit on the flat glass substrate, FIG. 3 the start of corner contouring, FIG. 4 the end of corner contouring, and FIG. 5 the elimination of the coupling between the second carrier unit and the flat glass substrate.

In FIG. 1, the flat glass substrate 1 is depicted in continuous feed-through movement. The continuous feed-through movement is symbolized by the arrow on the flat glass 1. The movement of a first carrier unit 10 is synchronized to this continuous feed-through movement, so that both the carrier unit 10 and the flat glass substrate 1, apart from unintentional, erroneous deviations, if any exist, exhibit the same continuous feed-through speed and continuous feed-through direction. The first carrier unit 10 is driven by a first drive unit 13a, which, for example, as depicted here, can be composed of a spindle 14a and a servo-motor 15a.

A second carrier unit 11 is arranged on the first carrier unit 10 and is movable in the plane of the flat glass substrate 1 relative to the first carrier unit 10. In addition, the second carrier unit is supported by spring elements 12a and 12b against the first carrier unit 11. The spring element 12a acts parallel to the continuous feed-through direction of the flat glass and the spring element 12b acts perpendicular to it and both act in the plane of the flat glass substrate 1. The second carrier unit 11, first of all, is moved together with the first carrier unit 10 in a manner that is synchronous with respect to the continuous feed-through movement of the flat glass substrate 1.

The tool 20 is arranged movably on the second carrier unit 11. The tool movement (also referred to as "advance") also occurs in two dimensions in the plane of the flat glass substrate 1 and is driven via servo-drives 21a and 21b, which have their reference point on the second carrier unit. This circumstance ensures that the relative movement between the tool and the second carrier unit is defined solely by the tool track. The drive units 21a and 21b are arranged in the example shown in such a way that the drive unit 21a drives the tool 20 parallel and the drive unit 21b drives the tool 20 perpendicular to the continuous feed-through direction of the flat glass substrate 1. Other positions of the drive axes are also possible, however. The two servo-drives 21a and 21b in FIG. 1 each have a motor 22a, 22b and a spindle 23a, 23b.

Figure 2:
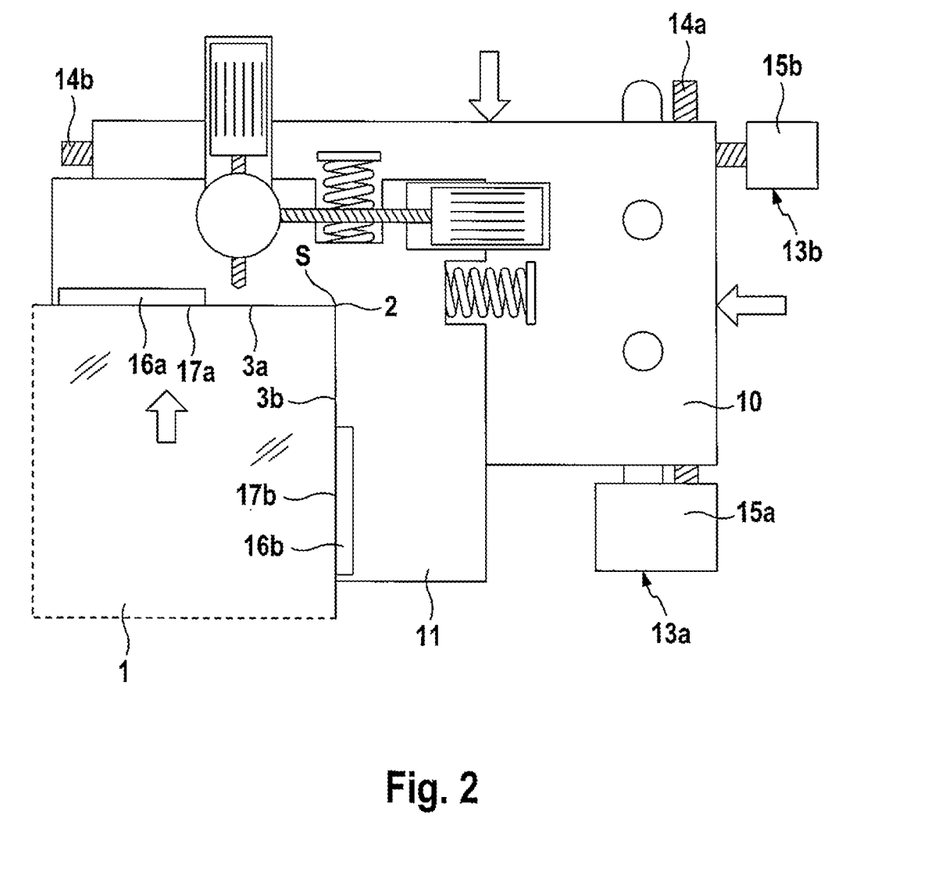

Depicted in FIG. 2 is the coupling step between the second carrier unit 11 and the flat glass substrate 1. For this purpose, the second carrier unit 11 has two signal transmitters 16a and 16b. For coupling between the flat glass substrate 1 and the second carrier unit 11, the first carrier unit 10 is moved by means of the first drive unit 13a parallel to the continuous feed-through movement of the flat glass substrate and by means of the second drive unit 13b perpendicular thereto in the direction of the flat glass substrate 1. If the front edge 3a of the flat glass substrate 1 comes into contact with the associated signal transmitter 16a, the latter emits a contact signal. The same thing happens when the lateral edge 3b bumps against the associated signal transmitter 16b. The signal transmitters 16a and 16b can be, for example, mechanical, electrical, acoustic, or else even optical signal transmitters. They create the "co-running stop," against which the flat glass 1 is applied by the edges 3a and 3b in a form-fitting manner. The corner 2 of the flat glass substrate 1 being worked is now situated exactly at the intersection S of the extended edges of the lateral faces 17a and 17b of the co-running stop that face the glass substrate 1.

The signal transmitters 16a and 16b permit the so-called "tactile application." In the case shown, they respond simply to contact. Alternatively, distance or force sensors also come into consideration. Their directions of action coincide with those of the spring elements 12a and 12b. The spring elements enable the first carrier unit, upon tactile application, also to travel by a certain travel path beyond the first contact in the direction of the glass substrate and, in doing so, to pretension the spring elements, that is, to adjust a desired pressing force. Afterward, the active part of the application is terminated.

In this variant of the mechanical coupling, the second carrier unit remains afterward passively applied against the flat glass substrate owing to the spring elements. In this way, any deviation from the actual position of the corner from its set position as well as also any unsteady movement, that is, any differential movement between the flat glass substrate and the synchronized first carrier unit, are equilibrated. A relative movement between the flat glass substrate and the contouring tool is then, as described below, determined exclusively by the predetermined tool track of the contouring tool. Of course, it should be noted that the spring or retaining forces of the spring elements 12a and 12b, which join the second carrier unit 11 to the first carrier unit 10, are great enough so as to allow no relative movement between the flat glass 1 and the second carrier unit 11 and to oppose with sufficient resistance the feed and cutting forces occurring during working.

Figure 3:
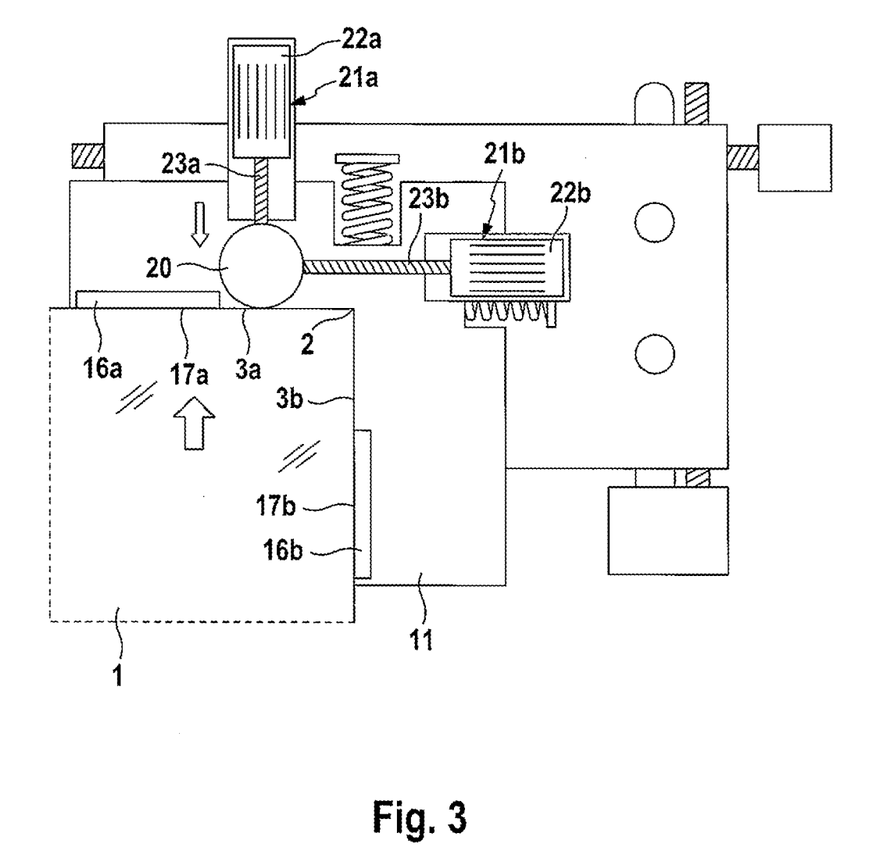

The subsequent start of the corner contouring will be explained on the basis of FIG. 3. Once the second carrier unit 11 and the flat glass substrate 1 are coupled together, the tool 20 approaches the flat glass 1. The starting point is situated along the front edge 3a of the flat glass substrate 1 applied against the signal transmitter 16a. Because the entirety of the servo-drives 21a and 21b for the tool advance or at least the reference points thereof are arranged on the second carrier unit and, for this purpose, the flat glass substrate is fixed in position, the start of the corner contouring is possible without any starting point offset between the tool 20 and the flat glass substrate 1.

Figure 4:
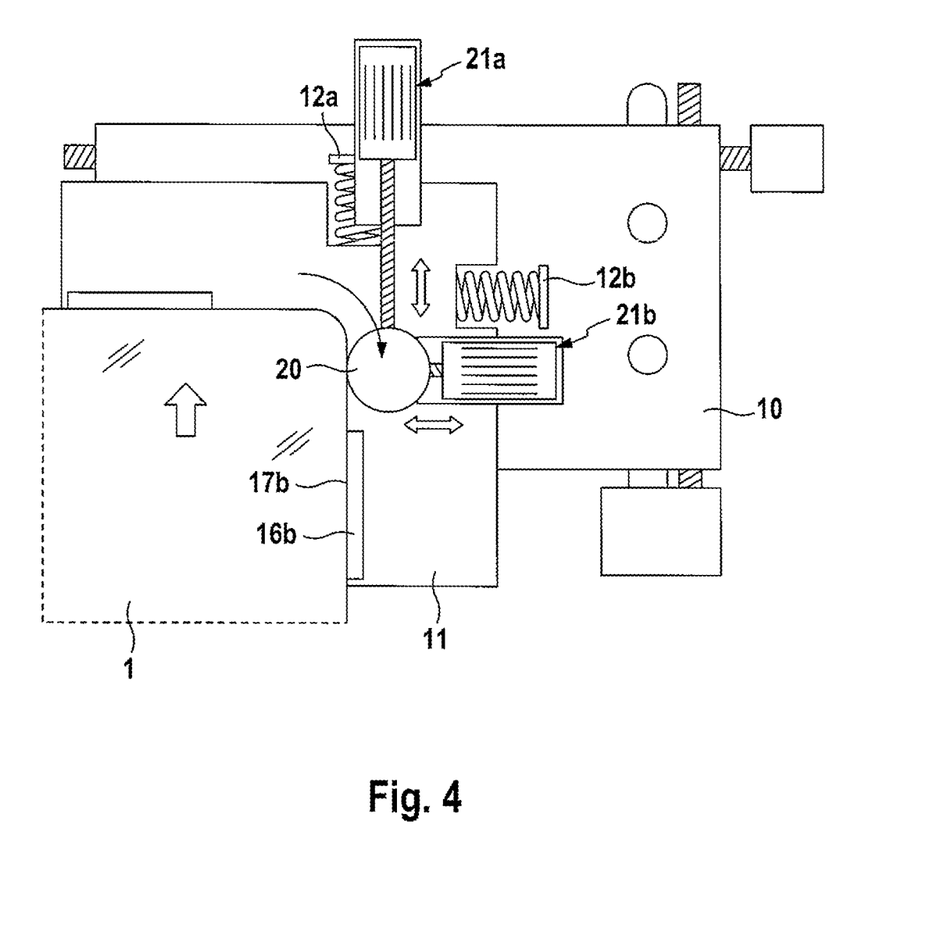

As depicted in FIG. 4, the actual contouring of the corner 2 subsequently starts with further, now coupled, synchronous travel, that is, with retention of the form fit between the second carrier unit 11 and the flat glass substrate 1. In this process, the control of the servo-drives 21a, 21b occurs preferably by means of a CNC control. Owing to the continued existence of coupling between the flat glass substrate 1 and the second carrier unit 11, the predetermined track of the tool 20 is the only relative movement that occurs between the flat glass 1 and the tool 20. The working is finished when the end point along the lateral edge 3b of the flat glass 1 is reached.

Figure 5:
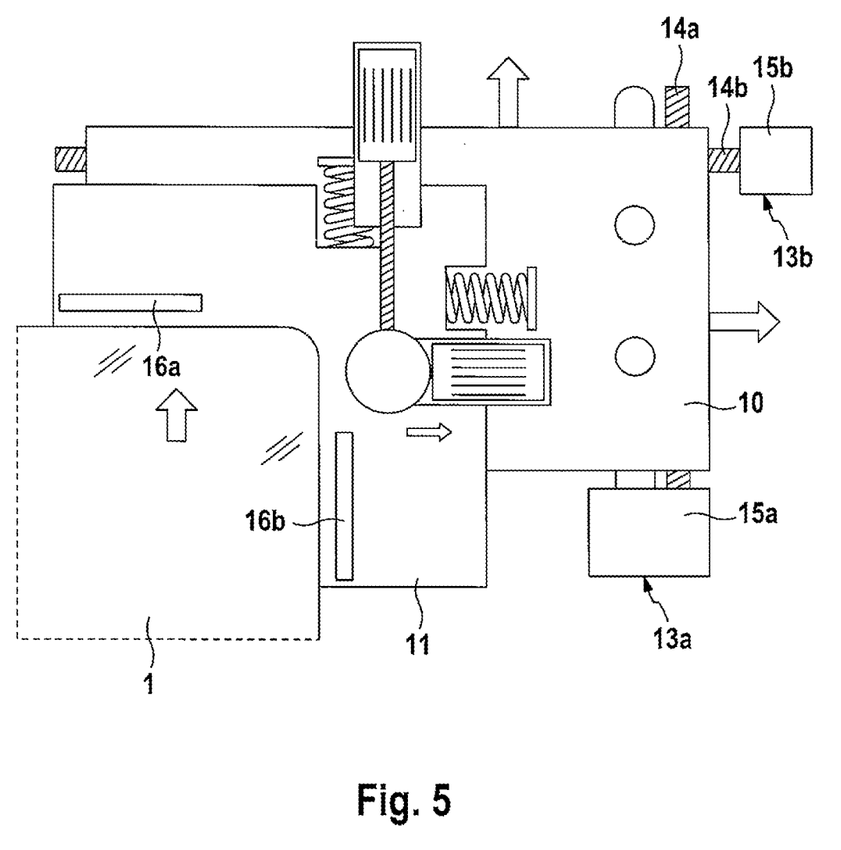

As soon as the contouring has been finished, the tool 20 is withdrawn from the glass substrate 1 by means of the servo-drives 21a and 21b. The first carrier unit 10 continues to remain synchronized with the continuous feed-through movement of the glass 1, and the second carrier unit 11 remains joined to the glass 1 in a form-fitting manner. Only when the tool 20 is sufficiently distanced from the glass substrate 1 does the decoupling of the flat glass substrate 1 from the second carrier unit 11 take place, in that the first carrier unit 10, together with the second carrier unit 11 positioned on top of it, is caused to travel by means of the drive units 13a and 13b. Both are illustrated in FIG. 5. The corner contouring is now finished.

LIST OF REFERENCE NUMBERS 1 flat glass substrate
2 corner
3a,b lateral edges of the flat glass substrate
10 first carrier unit
11 second carrier unit
12a,b spring element
13a,b drive unit
14a,b spindle
15a,b servo-motor
16a,b signal transmitter
17a,b lateral face of the signal transmitter
20 tool
21a,b servo-drive
22a,b motor
23a,b spindle

What is claimed is:

1. A method for corner contouring of a flat glass substrate in a continuous feed-through process using a contouring tool, comprising the steps of:
synchronizing movement of a first carrier unit to the continuous feed-through movement of the flat glass substrate;

mechanically, electrically, acoustically, or optically coupling a second carrier unit being movably mounted on the first carrier unit to the flat glass substrate;

contouring a corner of the flat glass substrate, wherein relative movement between the contouring tool and the second carrier is performed to overlap the continuous feed-through movement.

2. The method according to claim 1, wherein the relative movement is coupled to the corner of the flat glass substrate.

3. The method according to claim 1, wherein the mechanically coupling of the second carrier unit to the flat glass substrate comprises placing the second carrier unit in a form-fitting manner against the flat glass substrate, and wherein the contouring the corner of the flat glass substrate takes place while maintaining the form-fitting between the second carrier unit and the flat glass substrate.

4. The method according to claim 3, wherein the second carrier unit is mounted on the first carrier unit in two axial directions in a plane of the flat glass substrate.

5. The method according to claim 3, further comprising operating spring elements between the first carrier unit and the second carrier unit in the two axial directions in the plane of the flat glass substrate, which, during the coupling of the second carrier unit to the flat glass substrate, press the second carrier unit permanently against the flat glass substrate.

6. The method according to claim 5, wherein the spring elements operate with spring forces that are greater than advancing forces of the movement of the first carrier unit or cutting forces of the contouring step.

7. The method according to claim 5, further comprising disposing two signal transmitters on the second carrier unit, the two signal transmitters having operating directions that coincide with operating directions of the spring elements.

8. The method according to claim 5, wherein the spring elements are pre-tensioned.

9. The method according to claim 3, wherein the form-fitting placement of the second carrier unit against the flat glass substrate occurs tactilely.

10. The method according to claim 3, further comprising disposing one or a plurality of signal transmitters on the second carrier unit so that when the second carrier unit is placed against the flat glass substrate, the first carrier unit is advanced until the one or more signal transmitters emits a signal upon contact with the flat glass substrate or upon exceeding a predetermined force value, or upon detecting a predetermined distance.

11. The method according to claim 3, wherein, after the coupling of the second carrier unit to the flat glass substrate, the second carrier unit and the flat glass substrate are fixed in position relative to each other.

12. The method according to claim 3, further comprising clamping the second carrier unit and the flat glass substrate.

* * * * *